United States Patent

Beaudoin et al.

[11] Patent Number: 5,984,332
[45] Date of Patent: Nov. 16, 1999

[54] COLLAPSIBLE TRAILER FOR A BICYCLE OR SIMILAR VEHICLE

[76] Inventors: Maurice Beaudoin, 850, 111e Avenue, Drummondville, Quebec, Canada, J2B 4L2; Richard Beaudoin, 809, 110e Avenue, Drummondville, Quebec, Canada, J2B 4L6

[21] Appl. No.: 09/031,906

[22] Filed: Feb. 27, 1998

[51] Int. Cl.$^6$ ................................... B62B 7/02
[52] U.S. Cl. ................ 280/204; 280/647; 280/656
[58] Field of Search .................. 280/392, 204, 280/401, 656, 639, 647, 650, 657, 658, 1.5, 642, 644

[56] References Cited

U.S. PATENT DOCUMENTS

| | | | |
|---|---|---|---|
| 4,311,322 | 1/1982 | Verros | 280/656 |
| 4,679,807 | 7/1987 | Raybon | 280/65 |
| 4,953,880 | 9/1990 | Sudakoff et al. | 280/47.38 |
| 5,020,814 | 6/1991 | George et al. | 280/204 |
| 5,076,599 | 12/1991 | Lockett et al. | 280/204 |
| 5,259,634 | 11/1993 | Berner et al. | 280/204 |
| 5,460,395 | 10/1995 | Chen | 280/204 |
| 5,474,316 | 12/1995 | Britton | 280/204 |
| 5,669,618 | 9/1997 | Chiu | 280/204 |
| 5,785,333 | 7/1998 | Hinkson et al. | 280/204 |
| 5,829,771 | 11/1998 | Hsu | 280/204 |

FOREIGN PATENT DOCUMENTS 1281344  10/1969  United Kingdom .

*Primary Examiner*—Anne Marie Boehler
*Attorney, Agent, or Firm*—Collard & Roe, P.C.

[57] ABSTRACT

The collapsible bicycle trailer comprises a chassis and wheels. The chassis includes an upper frame assembly having a front end pivotally connected to the front end of a lower frame assembly and a back frame unit including a pair of oppositely disposed back frame members- Each back frame member has an upper end pivotally connected to the rear end of the upper frame assembly and a lower end removably securable to the rear end of the lower frame assembly. The back frame unit is pivotable around the upper end of the back frame members between a folded position, where the upper frame assembly is rotated towards the lower frame assembly for folding the chassis into a compact position, and an opened position, where the lower end of each of the back frame members is secured to the lower frame assembly for opening and keeping the chassis into an extended position.

12 Claims, 4 Drawing Sheets

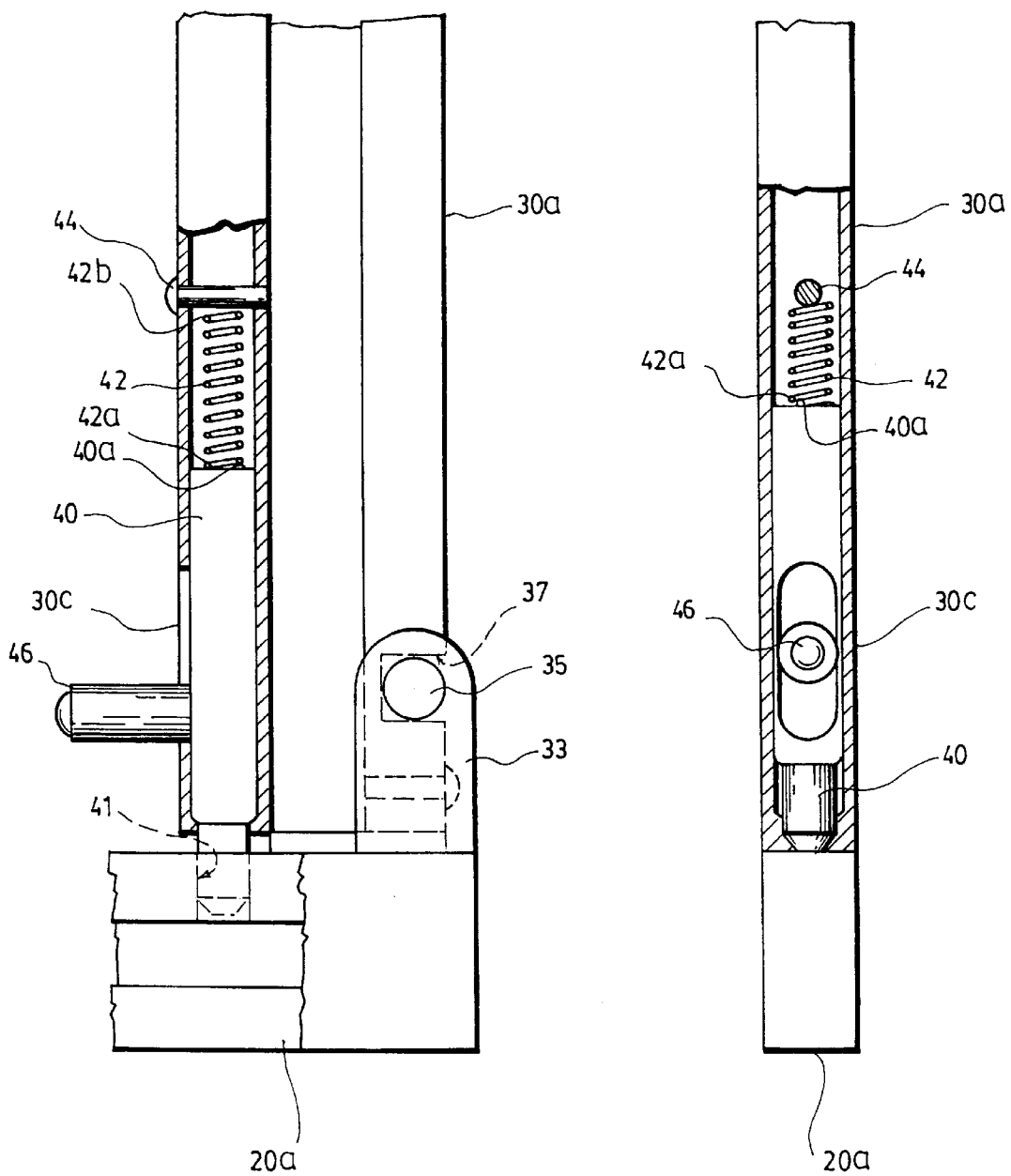

COLLAPSIBLE TRAILER FOR A BICYCLE OR SIMILAR VEHICLE

FIELD OF THE INVENTION

The present invention relates to a collapsible trailer and more particularly, it concerns a collapsible trailer suitable for use with a bicycle or similar vehicles.

BACKGROUND OF THE INVENTION

Many types of bicycle trailers are known in prior art. As can be easily understood, it may be greatly advantageous to be able to store or carry a bicycle trailer into a compact form. Already known in prior art, there are certain foldable or collapsible bicycle trailers. Examples of such bicycle trailers are given in U.S. Pat. No. 5,020,814 and U.S. Pat. No. 5,474,316. U.S. Pat. No. 5,020,814 discloses a collapsible trailer including a rigid chassis frame, and hinged side rails rotatable on corresponding hinge members between an extended vertical position and a folded position essentially parallel to the chassis frame. A side rail locking bar is provided to lock the side rail in the extended position. US patent no. 5,474,316 discloses a folding trailer comprising an upper frame member, a lower frame member and a pair of folding units. The weakness of folding locations is often a source of problems, and developments in stronger and simpler mechanisms for compacting a bicycle trailer are needed.

SUMMARY OF THE INVENTION

The present invention is directed to a collapsible trailer that satisfies the above-mentioned need.

In accordance with the present invention, this object is achieved with a collapsible trailer comprising a chassis as described below and displacement means for displacing the chassis. The chassis is characterized in that it includes an upper frame assembly defining an upper limit of the chassis, the upper frame assembly having a front end and a rear end. The lower limit of the chassis is defined by a lower frame assembly having a front end and a rear end the front end being pivotally connected to the front end of the upper frame assembly.

The chassis further comprises a back frame unit including a pair of oppositely disposed back frame members. Each back frame member has a first end pivotally connected to the rear end of the upper frame assembly and a second end removably securable to the rear end of the lower frame assembly such that the back frame unit is pivotable around the first end of the back frame members between a folded position where the upper frame assembly is rotated towards the lower frame assembly for folding the chassis into a compact position and an opened position where the second end of each of the back frame members is secured to the lower frame assembly for opening and keeping the chassis in the open position.

Securing means are provided for removably securing the second end of each back frame member to the rear end of the lower frame assembly.

As can be appreciated, a bicycle trailer according to the present invention, besides being easy to collapse because of the few parts composing the chassis, is also very robust, especially in its open position, as compared to the prior art collapsible bicycle trailers. A bicycle trailer according to the present invention is also not expensive to manufacture.

The securing means preferably comprise means for limiting the rotation of the upper frame assembly away from the lower frame assembly in a maximum angular relationship as the chassis is in the open position and, for each back frame member, a retractable peg operatively mounted at the second end thereof. The peg is movable between a locking position where it is protruding from the second end for engaging a corresponding opening in the lower frame assembly and a retracted position for disengaging the peg from the corresponding opening in the lower frame assembly. As can be appreciated, because the upper frame assembly and the lower frame assembly are in a maximum angular relationship as the chassis is in the open position, meaning that the chassis cannot open more, the back frame members are in a certain way clamped between the upper and lower frame assembly when the chassis is in the open position. The pegs then serve to keep the back members clamped, thereby making the trailer very solidly mounted with a very simple mechanism.

According to another aspect of the present invention, there is provided a collapsible trailer comprising:

a chassis including:
   an upper frame assembly defining an upper limit of the chassis, the upper frame assembly having a front end and a rear end;
   a lower frame assembly defining a lower limit of the chassis, the lower frame assembly having a front end and a rear end, the front end being pivotally connected to the front end of the upper frame assembly;
   a back frame unit including a pair of oppositely disposed back frame members, each back frame member having:
      a first end pivotally connected to the rear end of one of the upper and lower frame assembly;
      a second end removably securable to the rear end of the other one of the upper and lower frame assembly, the back frame unit being pivotable around the first end of the back frame members between a folded position where the upper frame assembly is rotated towards the lower frame assembly for folding the chassis into a compact position, and an opened position where the second end of each of the back frame members is secured to said other one of the upper and lower frame assembly for opening and keeping the chassis in the open position; and
   securing means for removably securing the second end of each back frame member to the rear end of said other one of the upper and lower frame assembly; and displacement means for displacing the chassis.

The invention and its advantages will be better understood after reading the non restrictive description of a preferred embodiment of the present invention. This description is given with reference to the appended drawings.

BRIEF DESCRIPTION OF THE DRAWINGS

FIG. 6 is an enlarged side elevational view of the lower end of one of the back frame members of the bicycle trailer of FIG. 1 showing the retractable peg in an engaged position; and FIG. 7 is a front view of the back frame member shown in FIG. 6.

| NUMERAL REFERENCE OF THE ELEMENTS | |
|---|---|
| 10 | collapsible trailer |
| 12 | chassis |
| 14 | wheels |
| 16 | hitch arm |
| 18 | upper frame assembly |
| 18a) | upper side frame members |
| 18b) | upper rear crossbar |
| 18c) | rear end of each upper side frame members |
| 18d) | upper front crossbar |
| 18e) | front end of each upper side frame member |
| 18f) | rear end of the upper frame assembly |
| 18g) | front end of the upper frame assembly |
| 20 | lower frame assembly |
| 20a) | lower side frame members |
| 20b) | lower rear crossbar |
| 20c) | rear end of each lower side frame members |
| 20d) | lower front crossbar |
| 20e) | front end of each lower side frame member |
| 20f) | rear end of the lower frame assembly |
| 20g) | front end of the lower frame assembly |
| 22 | hinge assembly |
| 22a) | bolts and nuts |
| 30 | back frame unit |
| 30a) | back frame members |
| 30b) | first end of each back frame memher |
| 30c) | second end of each back frame member |
| 30d) | back crossbar |
| 31 | hinge assembly |
| 32 | canvas |
| 33 | bracket means |
| 34 | guiding plates |
| 35 | fod |
| 37 | notch |
| 40 | pegs |
| 40a) | upper end of each peg |
| 41 | opening |
| 42 | helicoidal spring |
| 42a | one end of the helicoidal spring |
| 42b) | another end of the helicoidal spring |
| 44 | screw |
| 46 | handle |
| 50 | suspension system |
| 52 | transversal bar |
| 54 | curved end segments of the transversal bar |
| 56 | pivot point |
| 58 | tip portion of each of the curved end segments |
| 60 | shock absorber bars |
| 62 | rear end of the shock absorber bars |
| 64 | front end of the shock absorber bars peg (38) |

DESCRIPTION OF A PREFERRED EMBODIMENT

Figure 1:
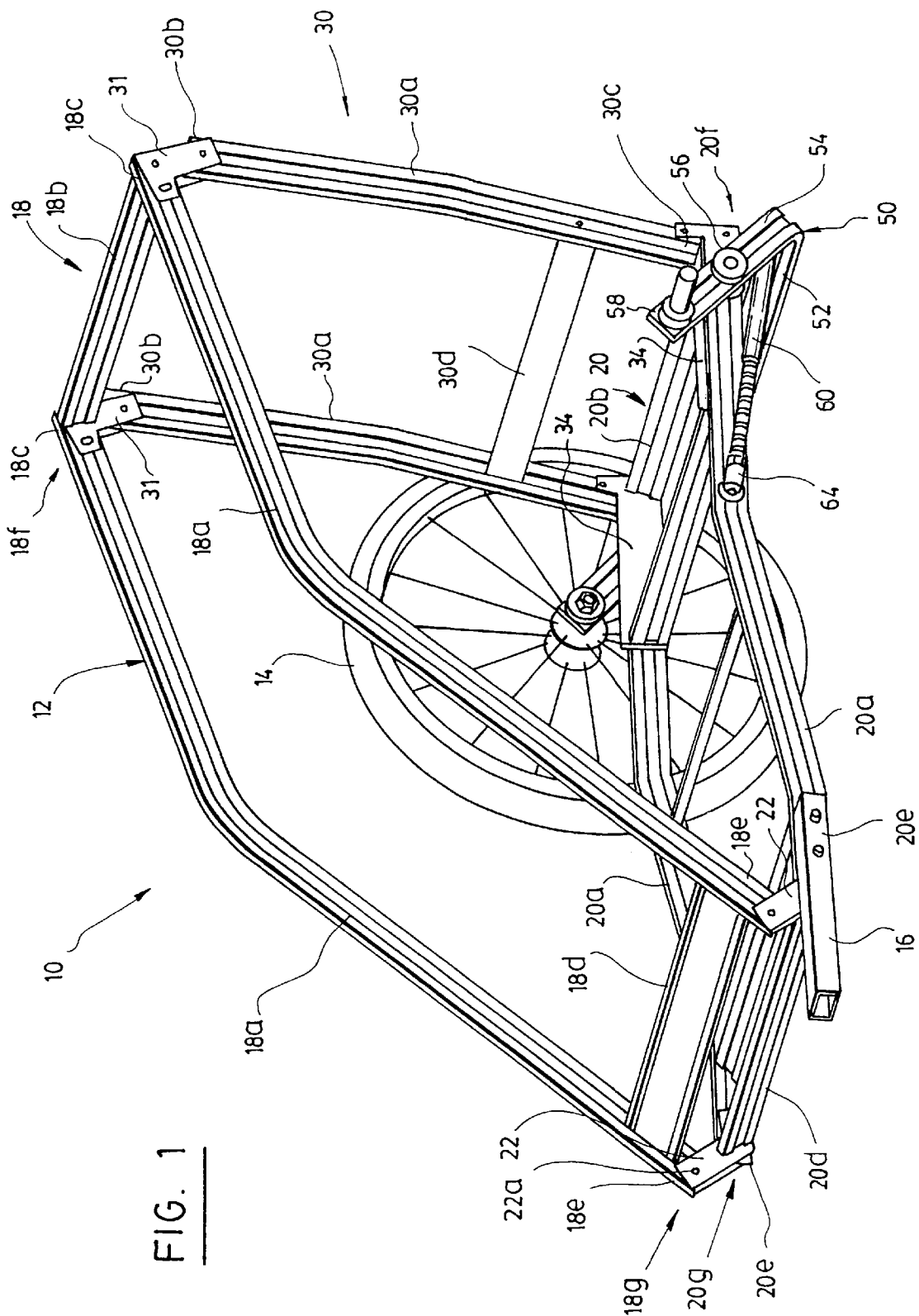
FIG. 1 is a perspective view of a collapsible trailer according to a preferred embodiment of the present invention with the canvas and one wheel removed to better see the chassis of the trailer.

Referring to FIG. 1, a collapsible trailer (10) according to the present invention comprises a chassis (12), two oppositely disposed wheels (14) operatively connected to the chassis (12) and a hitch arm (16) connected to the chassis (12) and extending forwardly therefrom. The hitch arm (16) has an end adapted to be connected to a bicycle frame (not illustrated). The chassis (12) comprises an upper frame assembly (18) which is preferably defined by a pair of oppositely disposed upper side frame members (18a), an upper rear crossbar (18b) connecting the rear end (18c) of the upper side frame members (18a) together and an upper front crossbar (18d) connecting the front end (18e) of the upper side frame members (18a) together. As can be appreciated, the upper frame assembly (18) defines an upper limit of the chassis (12) with the rear crossbar (18b) and the rear end (18c) of each upper side frame members (18a) defining the rear end (18f) of the upper frame assembly (18) and with the front crossbar (18d) and the front end (18e) of each upper side frame member (18a) defining the front end (18g) of the upper frame assembly (18a).

The chassis (12) further comprises a lower frame assembly (20) defined by a pair of oppositely disposed lower side frame members (20a), a lower rear crossbar (20b) connecting the rear end (20c) of the lower side frame members (20a) together and a lower front crossbar (20d) connecting the front end (20e) of the lower side frame members (20a) together. As can be appreciated, the lower frame assembly (20) defines a lower limit of the chassis (12) with the rear crossbar (20b) and the rear end (20c) of each lower side frame member (20a) defining the rear end (20f) of the lower frame assembly (20) with the front crossbar (20d) and the front end (20e) of each lower side frame member (20a) defining the front end (20g) of the lower frame assembly (20a).

Figure 2:
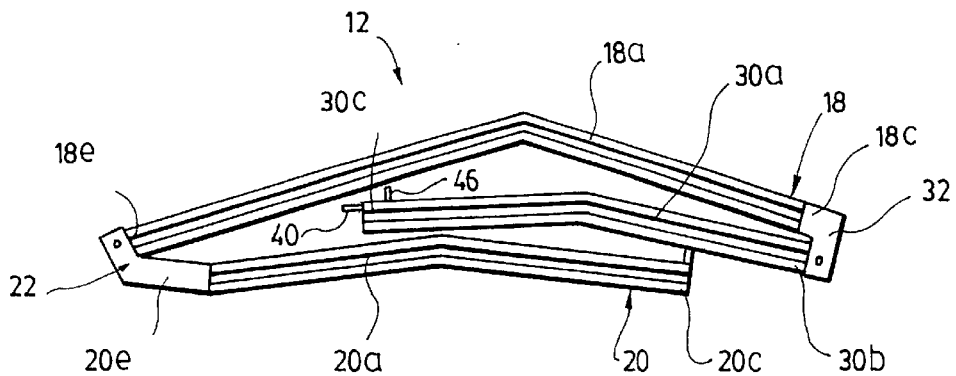
FIG. 2 is a side elevational view of the bicycle trailer of FIG. 1, showing the chassis in the folded position.
Figure 3:
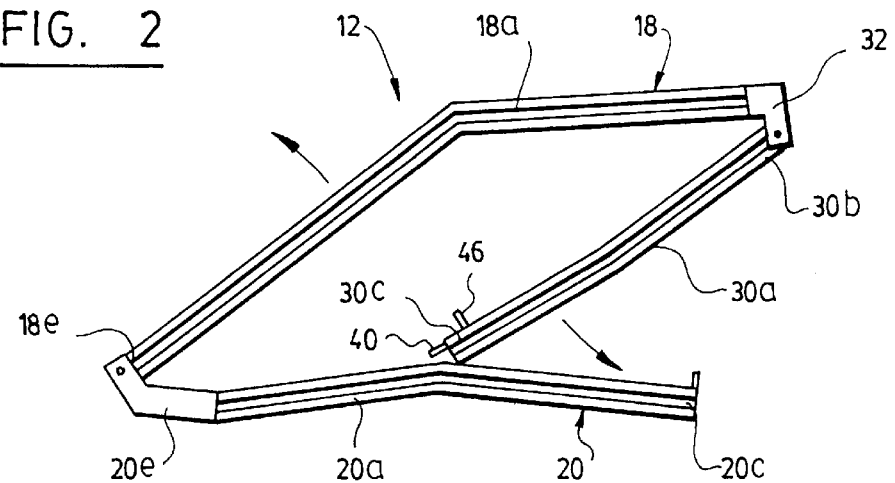
FIG. 3 is the same view of FIG. 2 showing the chassis in a partially folded position.
Figure 4:
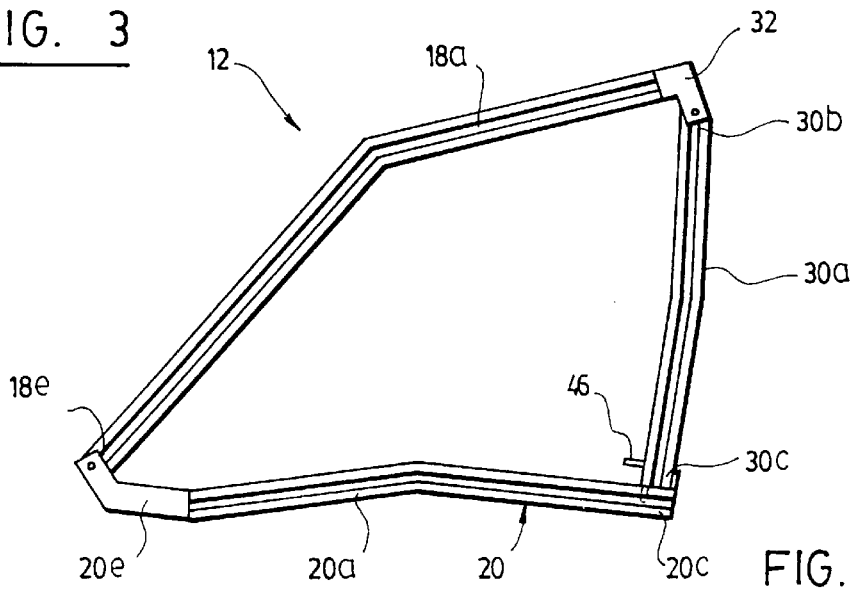
FIG. 4 is the same view of FIG. 2 showing the chassis in the open position.

As best seen in FIGS. 2 to 4, the front end (20g) of the lower frame assembly (20) is pivotally connected to the front end (18g) of the upper side frame assembly (18). More particularly, the front end (18e) of each upper side frame member (18a) is pivotally connected to the front end (20e) of its corresponding lower side frame member (20a) by means of a hinge assembly (22) consisting of a pair of parallel brackets between which said front ends (18e,20e) are each inserted. One or two bolts and nuts (22a) secure the front end (20e) of the lower side frame member (20a) in the hinge assembly (22) and a pivot pin pivotally connects the front end (18e) of the upper frame assembly (18a) therein.

The chassis (12) further includes a back frame unit (30) comprising a pair of oppositely disposed back frame members (30a). Each back frame member (30a) has a first end, in this case the upper end (30b)), which is pivotally connected to the rear end (18c) of a corresponding upper side frame member (18a) by means of a hinge assembly (31) substantially similar to the one described hereinbefore. Each back frame member (30a) also has a lower second end (30c) removably securable to the rear end (20c) of the corresponding lower side frame member (20a) such that the back frame unit (30) is pivotable around the upper end (30b)) of the back frame members (30a) between a folded position where the upper frame assembly (18) is rotated towards the lower frame assembly (20), as shown in FIGS. 2 and 3, for folding the chassis (12) into a compact position and an opened position, as shown in FIGS. 1 and 4, where the lower end (30c) of each of the back frame members (30a) is secured to the rear end (20c) of the corresponding lower side frame member (20a) for opening and keeping the chassis (12) into an extended position. The back frame unit (30) further preferably comprises a back crossbar (30d) connecting the back frame members (30a) together, thereby reinforcing the structure and enabling the back frame members (30a) to move as a unit. Guiding plates (34) for guiding the lower end (30c) of each back frame member (30a) towards the rear end (20c) of the corresponding lower side frame member (20e) may be provided along the rear end (20c) of each lower side frame member (20e), as best seen from FIG. 1.

It has to be noted that in another preferred embodiment of the present invention (not illustrated), the back frame unit may have been pivotally connected to the lower frame assembly instead of the upper frame assembly without departing from the scope of the present invention.

As best seen from FIG. 1, the upper frame members (18a,18b), the lower frame members (20a,20b,20c) and the back frame members (30a) each have a rectangular cross section and have two opposite side faces provided with a longitudinal groove adapted to receive an end of a corresponding crossbar.

Figure 5:
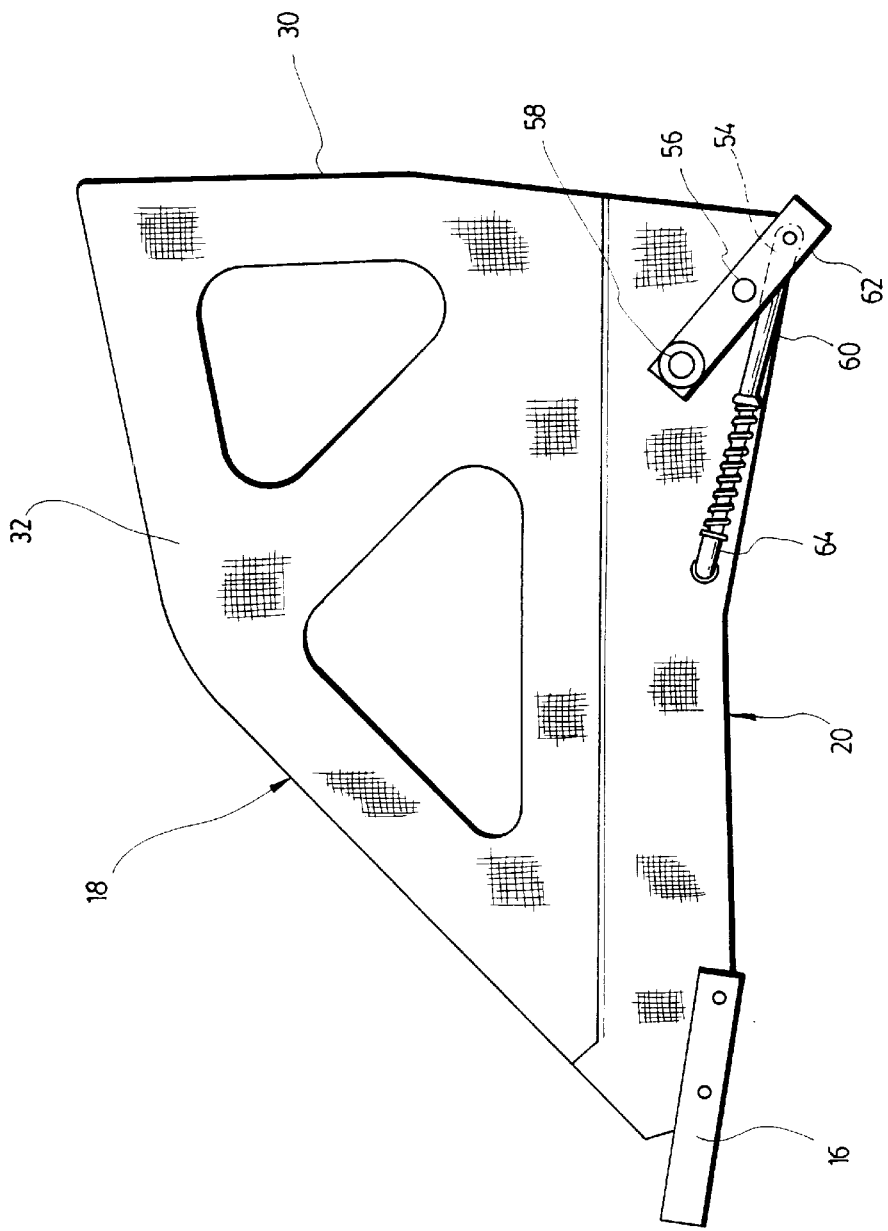
FIG. 5 is a side elevational view of the bicycle trailer of FIG. 1 illustrated with the canvas, shown in the open position.

Referring to FIG. 5, a canvas (32) is provided to tightly fit over the chassis (12). Apart from defining the passenger compartment of the trailer, this canvas (32) which is adapted to tightly fit over the chassis (12), also serves to limit the rotation of the upper frame assembly (18) away from the lower frame assembly (20). This limitation of rotation is also preferably obtained with a bracket means (33) mounted at the rear end (20c) of each of the lower side frame members (20a). Each of those bracket means (33) comprises a rod (35) adapted to engage a notch (37) provided at the lower end (30c) of a corresponding back frame member (30a) for retaining such back frame member (30a).

This limitation of rotation, as will be more fully explained above, plays an important part in the way the back frame unit (30) of the preferred embodiment illustrated is removably secured to the rear end (20f) of the lower frame assembly (20). More particularly and referring to FIGS. 6 and 7, each back frame member (30a) has its lower end (30c) removably securable to the rear end (20c) of the corresponding lower side frame member (30a) by means of a retractable peg (40) operatively mounted at the lower end (30c) of the back frame member (30a). As illustrated, the lower end (30c) of each back frame member (30a) is preferably hollowed for receiving therein the corresponding retractable peg (40). However, the peg (40) could have been mounted along the outer side of the back frame member without departing from the scope of the present invention- The peg (40) is movable between a locking position, as shown in FIG. 6, where it is protruding from the lower end (30c) of the back frame member (30a) for engaging an opening (41) in the corresponding lower side frame member (20a) and a retracted position, as shown in FIG. 7, for disengaging the peg (40) from the opening (41), thereby enabling the user to pull the back frame assembly (20) inwards to fold the chassis (12).

As can be appreciated, because the upper frame assembly (18) and the lower frame assembly (20) are in a maximum angular relationship as the chassis (12) is in the open position because of the canvas (32) preventing the chassis to open wider, the back frame members (30a) are in a certain way clamped between the upper and lower frame assembly (18,20) when the chassis (12) is in this open position. The pegs (40) then serve to keep the back frame members (30a) clamped, thereby making the trailer very solidly mounted with a very simple mechanism.

As illustrated in FIGS. 6 and 7, biasing means, preferably a spring element and most preferably a helicoidal spring (42), are provided for each back frame member (30a) for bringing back the peg (40) in the locking position. The spring (42) has an end (42a) secured to an upper end (40a) of the peg (40) and another end (42b) secured by means of a screw (44) or bolt to a location along the corresponding back frame member (30a). A handle (46) is connected to the peg (40) to move the same principally upwards.

Advantageously, to provide a better comfort for the passenger, the trailer (12) illustrated comprises a suspension system (50).

Referring more particularly to FIG. 1, the suspension system (50) comprises a transversal bar (52) extending outside the chassis (12) along the lower rear crossbar (20b). This transversal bar (52) has frontwards curved end segments (54) extending outside the chassis along a corresponding lower side frame member (20a) of the chassis (12). Each of the curved end segments (54) has a pivot point (56) pivotally connected to its corresponding side frame member (20a) and a tip portion (58) adapted to operatively connect a wheel (14) of the trailer (10). The suspension system further comprises (50) a shock absorber bar (60) associated with each curved end portion (54) of the transversal bar (60). The shock absorber bar (60) has a rear end (62) connected to a location along this curved end portion (54) opposite the tip portion (58) thereof with respect to the pivot point (56) and a front end (64) connected along the corresponding side frame member (20a). As illustrated, the shock absorber bar (60) extends below the curved end portion (54) and defines an acute angle therewith.

As it can be appreciated, a collapsible trailer according to the present invention has a simple mechanism to collapse in a compact form or be extended in an opened form. This collapsible trailer is believed to be more robust than prior art folding trailers because the back frame members do not fold on themselves. Although a preferred embodiment of the invention has been described in detail herein and illustrated in the accompanying drawings, it is to be understood that the invention is not limited to this precise embodiment and that various changes and modifications may be effected therein without departing from the scope or spirit of the invention.

What is claimed is:

1. A collapsible trailer comprising:
   a chassis including:
      an upper frame assembly defining an upper limit of the chassis, the upper frame assembly having a front end and a rear end;
      a lower frame assembly defining a lower limit of the chassis, the lower frame assembly having a front end and a rear end, the front end being pivotally connected to the front end of the upper frame assembly;
      a back frame unit including a pair of oppositely disposed back frame members, each back frame member having:
         a first end pivotally connected to the rear end of the upper frame assembly; and
         a second end removably securable to the rear end of the lower frame assembly, the back frame unit being pivotable around the first end of the back frame members between a folded position where the upper frame assembly is rotated towards the lower frame assembly for folding the chassis into a compact position, and an opened position where the second end of each of the back frame members is secured to the lower frame assembly for opening and keeping the chassis in the open position;
      a canvas adapted to tightly fit over the chassis to limit the rotation of the upper frame assembly away from the lower frame assembly in a maximum angular relationship as the chassis is in the open position; and
      securing means for removably securing the second end of each back frame member to the rear end of the lower frame assembly; the securing means comprising, for each back frame member, a retractable peg operatively mounted at the second end thereof, the peg being movable between a locking position where it is protruding from said second end for engaging a corresponding opening in the lower frame assembly, and a retracted position for disengaging the peg from said corresponding opening in the lower frame assembly and
      at least two wheels operatively connected to the lower frame assembly to support and displace the chassis forwards or backwards.

2. A collapsible trailer as claimed in claim 1, wherein the securing means for each back frame member further comprise;

biasing means for bringing back the peg in the locking positions, and a handle connected to the peg to move the peg.

3. A collapsible trailer as claimed in claim 2, wherein the biasing means for each back frame member comprise a spring element having an end secured to an upper end of the peg and another end secured to a location along the back frame member.

4. A collapsible trailer as claimed in claim 3, wherein the lower end of each back frame member is hollowed for receiving therein the corresponding retractable peg.

5. A collapsible trailer as claimed in claim 4, comprising a back crossbar connecting the back frame members together.

6. A collapsible trailer as claimed in claim 5, wherein the upper frame assembly includes:

a pair of oppositely disposed upper side frame members each having a rear end and a front end;

an upper rear crossbar connecting the rear end of said upper side frame members together; and an upper front crossbar connecting the front end of said upper side frame members together.

7. A collapsible trailer as claimed in claim 6, wherein the lower frame unit includes:

a pair of oppositely disposed lower side frame members each having a rear end and a front end, a lower rear crossbar connecting the rear end of said lower side frame members together; and a lower front crossbar connecting the front end of said lower side frame members together.

8. A collapsible trailer as claimed in claim 7, wherein the upper side frame members, the lower side frame members and the back frame members each have a rectangular cross section.

9. A collapsible trailer as claimed in claim 8, wherein the upper side frame members, the lower side frame members and the back frame members each have two opposite side faces provided with a longitudinal groove adapted to receive an end of a corresponding crossbar.

10. A collapsible trailer as claimed in claim 9, wherein the spring element for each back frame member is an helicoidal spring.

11. A collapsible trailer as claimed in claim 10, further comprising a hitch arm connected to the chassis and extending forwards therefrom, the hitch arm having an end adapted to be connected to a bicycle frame.

12. A collapsible trailer comprising:

a chassis including:

an upper frame assembly defining an upper limit of the chassis, the upper frame assembly having a front end and a rear end;

a lower frame assembly defining a lower limit of the chassis, the lower frame assembly having a front end and a rear end, the front end being pivotally connected to the front end of the upper frame assembly;

a back frame unit including a pair of oppositely disposed back frame members, each back frame member having:

a first end pivotally connected to the rear end of one of said upper and lower frame assembly; and a second end removably securable to the rear end of the other one of said upper and lower frame assembly, the back frame unit being pivotable around the first end of the back frame members between a folded position, where the upper frame assembly is rotated towards the lower frame assembly for folding the chassis into a compact position, and an opened position, where the second end of each of the back frame members is secured to said other one of the upper and lower frame assembly for opening and keeping the chassis in the open position;

a canvas adapted to tightly fit over the chassis to limit the rotation of the upper frame assembly away from the lower frame assembly in a maximum angular relationship as the chassis is in the open position; and securing means for removably securing the second end of each back frame member to the rear end of said other one of the upper and lower frame assembly; the securing means comprising, for each back frame member, a retractable peg operatively mounted at the second end thereof, the peg being movable between a locking position where it is protruding from said second end for engaging a corresponding opening in said other one of the upper and lower frame assembly, and a retracted position for disengaging the peg from said corresponding opening and at least two wheels operatively connected to the lower frame assembly to support and displace the chassis forwards or backwards.

* * * * *